UNITED STATES PATENT OFFICE.

WALTER LONGMAN, OF BROOKLYN, NEW YORK.

IMPROVEMENT IN MIXED PAINTS.

Specification forming part of Letters Patent No. 193,974, dated August 7, 1877; application filed June 16, 1877.

*To all whom it may concern:*

Be it known that I, WALTER LONGMAN, of Brooklyn, in the county of Kings and State of New York, have invented certain new and useful Improvements in Paints; and I do hereby declare that the following is a full, clear, and exact description thereof, which will enable others skilled in the art to which it appertains to make and use the same.

The object of my invention is to furnish an improved paint, which is cheaper in cost and possesses the qualities of adherence and permanency in no degree inferior to the usual preparation of the best English white lead and pure linseed-oil.

I prepare my paint in a fluid form, ready for application without further manipulation.

The process of manufacture is as follows: I take ninety-five parts, by weight, of oxide of zinc, ten parts of carbonate of lead, and from twenty-five to fifty per cent. of silicate of alumina or aluminous clay in the form of a fine powder. These proportions may be varied within reasonable limits.

If the lead were used alone, or in much larger proportions than here stated, it would be liable to settle, and thus impair the usefulness of my preparation as a paint mixed ready for use.

I mix the above by grinding them together in a mill with the appropriate pigments to produce the shade or color desired. When finely ground, I mix the compound thus produced with linseed-oil, spirits of turpentine, black oxide of manganese drier, and cowrie-gum varnish, to a proper consistency for painting.

The proportions of these latter substances are about as follows: Linseed-oil, fifty per cent.; spirits turpentine, seventeen per cent.; black oxide of manganese drier, three per cent.; cowrie-gum varnish, five per cent.

The last-named element is not essential to produce a good quality of my paint; but is introduced to give adhesiveness and body to the spirits of turpentine.

I am aware that aluminous clay has been used as an admixture of "paste-paint," so called in the trade; but by my process of manufacture, and in the proportions in which I use it as combined with the other ingredients named, a new result is produced, and one not heretofore attained, for while a single gallon of pure white lead and oil-paint will cover a certain area of surface, the same quantity of my preparation will cover an equal or greater surface more thoroughly, and, as the evidence of its satisfactory use indicates, it will do so in an equally efficient and permanent manner, and at considerably less cost. It also possesses the quality of adherence in a marked degree, and will not peel off after any lapse of time, and, on scraping it, does not come off as a dry powder, but fibrous, as if it were of a horny substance.

Having thus described my invention, what I claim as new, and desire to secure by Letters Patent, is—

A paint compounded of oxide of zinc, with or without the carbonate of lead, with silicate of alumina, linseed-oil, spirits of turpentine, black oxide of manganese drier, and with or without cowrie-gum varnish, and with or without coloring-pigments, in the proportions substantially as herein described.

In testimony that I claim the foregoing as my own I affix my signature in presence of two witnesses.

WALTER LONGMAN.

Witnesses:
 JOHN W. PILLING,
 GEORGE A. SAWYER.